United States Patent
Singh et al.

(10) Patent No.: US 9,825,935 B2
(45) Date of Patent: Nov. 21, 2017

(54) GATEWAY FACILITATING DOCUMENT TRANSACTIONS AND RELATED METHODS

(71) Applicant: Conduent Business Services, LLC, Dallas, TX (US)

(72) Inventors: Atul Singh, Bangalore (IN); Anirban Mondal, Bangalore (IN); Kovendhan Ponnavaikko, Chennai (IN); Deepthi Chander, Cochin (IN); Koustuv Dasgupta, Bangalore (IN); Nischal Murthy Piratla, Fremont, CA (US); Mark Johnston, Silverton, OR (US)

(73) Assignee: Conduent Business Services, LLC, Dallas, TX (US)

( * ) Notice: Subject to any disclaimer, the term of this patent is extended or adjusted under 35 U.S.C. 154(b) by 445 days.

(21) Appl. No.: 14/175,025

(22) Filed: Feb. 7, 2014

(65) Prior Publication Data
US 2015/0227896 A1 Aug. 13, 2015

(51) Int. Cl.
*H04L 29/06* (2006.01)
*G06F 17/30* (2006.01)
(Continued)

(52) U.S. Cl.
CPC ........ *H04L 63/0823* (2013.01); *G06F 17/248* (2013.01); *G06F 17/30011* (2013.01);
(Continued)

(58) Field of Classification Search
CPC .......................... H04L 9/3247; H04L 63/0823; H04L 63/0815
(Continued)

(56) References Cited

U.S. PATENT DOCUMENTS 5,783,808 A * 7/1998 Josephson .............. G06Q 20/02
 235/379
9,058,515 B1 * 6/2015 Amtrup .................. H04N 1/387
(Continued)

FOREIGN PATENT DOCUMENTS

| GB | 2483051 A1 | 2/2012 |
| GB | 2484653 A1 | 4/2012 |
| WO | WO2011157092 A1 | 12/2011 |

*Primary Examiner* — Jagdish Patel
(74) *Attorney, Agent, or Firm* — Jones Robb, PLLC

(57) ABSTRACT

Embodiments of the present disclosure disclose gateway facilitating document transactions and related methods. Specifically, the disclosure discloses a gateway facilitating document transactions within a third party workflow. The gateway includes a front-end module and a controller. The front-end module is configured for providing one or more interfaces to a user to perform a document transaction, the one or more interfaces being configured for allowing the user to login into a document banking account of the user; displaying one or more documents available in the document banking account of the user; and allowing the user to select one or more documents for the transaction. The controller, interacting with the front-end module, and being configured for authenticating the third party, and the user for the document transaction; and based on the authentication, transferring the one or more documents selected by the user from the document banking account of the user to a document banking account of the third party.

9 Claims, 8 Drawing Sheets

(51) Int. Cl.
  *G06Q 20/14*  (2012.01)
  *G06Q 20/02*  (2012.01)
  *G06Q 20/32*  (2012.01)
  *G06F 17/24*  (2006.01)
  *G06F 21/62*  (2013.01)
  *G06Q 40/02*  (2012.01)

(52) U.S. Cl.
  CPC .. *G06F 17/30595* (2013.01); *G06F 17/30864* (2013.01); *G06F 21/6245* (2013.01); *G06Q 20/027* (2013.01); *G06Q 20/14* (2013.01); *G06Q 20/3221* (2013.01); *G06Q 40/02* (2013.01)

(58) Field of Classification Search
  USPC .......................................................... 705/39
  See application file for complete search history.

(56) References Cited

U.S. PATENT DOCUMENTS

| | | | |
|---|---|---|---|
| 2007/0255743 A1* | 11/2007 | Gaucas | G06F 21/608 |
| 2010/0094756 A1* | 4/2010 | Humphrey | G06Q 20/02 705/44 |
| 2011/0023096 A1* | 1/2011 | Xiao | H04L 63/0236 726/5 |
| 2015/0199660 A1* | 7/2015 | Dolan | G06Q 20/10 705/37 |

* cited by examiner

Embassy of Atlantis

Visas
Nonimmigrant
Immigrant
FAQ
News
Application

▸ Years ▸ Application

Application id: 19891 — 402

▲ Step 1: Fill the form

▼ Step 2: Submit documents

| Document Type | Submitted Document |
|---|---|
| Identity Proof | |
| Address Proof | |
| Bank Statement | |
| Fee Receipt | |

↑ 404

Do you want to use your document banking account to submit documents?

- Yes, Go to Document Banking — 406
- No, Submit at the embassy

▲ Step 3: Make an appointment

Submit    Cancel

Embassy of Atlantis

Visas
Nonimmigrant
Immigrant
FAQ
News
Application

⌂ ▸ Years ▸ Application

Application id: 19891

▲ Step 1: Fill the form

▼ Step 2: Submit documents

| Document Type | Submitted Document |
|---|---|
| Identity Proof | 19891 - Identity Proof |
| Address Proof | 19891 - Address Proof |
| Bank Statement | 19891 - Bank Statement |
| Fee Receipt | 19891 - Fee Receipt |

← 424

[ Submit ]  [ Cancel ]

▲ Step 3: Make an appointment

GATEWAY FACILITATING DOCUMENT TRANSACTIONS AND RELATED METHODS

CROSS-REFERENCE TO RELATED APPLICATION(S)

The present disclosure relates to U.S. application Ser. No. 13/969,635, filed 19 Aug. 2013 and entitled METHODS AND SYSTEMS FOR FACILITATING DOCUMENT BANKING.

TECHNICAL FIELD

The presently disclosed embodiments relate to document transactions, and more particularly, to gateway facilitating document transactions and related methods.

BACKGROUND

Various types of entities or organizations, such as, banks, embassies, hospitals, insurance companies, etc., offer services to users, such as, customers or potential customers. For example, banks offer loan services, embassies offer visa services/approvals, etc. The entities or organizations have their own defined procedures (hereinafter, workflows) corresponding to the services, which the users must execute to obtain or participate in the services that are offered. Certain workflows may involve document transactions between an organization and a user, such as where the workflow requires that the user submit a document, multiple documents, or even a significant number of documents to the entity or organization. For example, if a user wishes to apply for a United States (U.S.) visa, then the user needs to submit a set of documents, such as passport, address proof, bank account statement, photo, etc., to the U.S. Embassy.

However, the existing workflows require that the user and the organization communicate in an inefficient, attenuated, and/or adhoc manner (outside of the workflow). For example, the user first completes or otherwise provides information in an application form (online or manually on a hard copy), and then submits supporting documents. In order to perform this operation, the user first manually gathers the original or certified copies of these documents by accessing different sources (such as, a government office, real estate agency, bank, etc.), and then submits the gathered documents to the entity or organization (such as the U.S. Embassy) in person, by mail, etc. The user must provide the entity or organization with an application identity (generated at the time of completing or otherwise providing information in the application form) when submitting these documents. Upon receipt, the entity or organization manually associates or correlates the user's submitted documents with the corresponding user, i.e., application identity, so that the submitted documents are associated with the appropriate user.

This process is cumbersome, time-consuming and/or error prone, and also causes human stress, loss of organizational productivity, etc. For example, this process requires the user to perform multiple steps at different times, such as completing or providing information in the application form, manually gathering the documents, submitting the gathered documents, etc. This process similarly burdens the entity or organization, such as by requiring that the entity or organization associate the submitted documents with the appropriate user. Other inefficiencies may also arise due to the fact that submission of the documents is disassociated or otherwise separated from the user's completion and/or submission of the application form.

In some cases, the user may have an online document account and can retrieve the documents from that account for submission. However, even in these cases, the user needs to separately login to the document account to transfer the document(s) to the entity or organization, and thus, disassociates the third party workflow from the document account of the user. Here, also the user performs the document transaction outside the organization workflow. It may therefore be beneficial to enable submission of the documents in a manner that is not disassociated or otherwise separated from the user's completion and/or submission of the application form.

SUMMARY

In one embodiment, a gateway facilitating document transaction within a third party workflow is disclosed. The gateway includes a front-end module and a controller. The front-end module is configured for providing one or more interfaces to a user to perform a document transaction, the one or more interfaces being configured for allowing the user to login into a document banking account of the user; displaying one or more documents available in the document banking account of the user; and allowing the user to select one or more documents for the transaction. The controller, interacting with the front-end module, and being configured for authenticating the third party, and the user for the document transaction; and based on the authentication, transferring the one or more documents selected by the user from the document banking account of the user to a document banking account of the third party.

In another embodiment, a gateway facilitating document transactions is disclosed. The gateway includes a controller configured for receiving a unique identifier from a third party for a document transaction; authenticating the third party for the document transaction; authenticating a user to login into a document banking account of the user, to perform the document transaction; upon authentication, obtaining one or more documents maintained with the document banking account of the user; transferring one or more documents selected by the user from the document account of the user to a document account of the third party; renaming the selected documents while transferring; and redirecting the user to the third party for further processing.

In further embodiment, a system is disclosed. The system includes a third party and a gateway. The third party is configured for sending a unique identifier and a list of documents required by the third party to the gateway. The gateway being configured for integrating the third party workflow with a document banking system and is further configured for receiving the unique identifier and the list of documents from the third party; authenticating the third party for the document transaction; authenticating a user to login into a document banking account of the user, to perform the document transaction; upon authentication, obtaining one or more documents maintained with the document banking account of the user; transferring one or more documents selected by the user from the document account of the user to a document account of the third party; renaming the selected documents while transferring; and redirecting the user to the third party for further processing.

In furthermore embodiment, a method facilitating document transactions within a third party workflow is disclosed. The method includes authenticating the third party for a document transaction. The method further includes authenticating a user to login into a document banking account of the user, to perform the document transaction. The method furthermore includes upon authentication, obtaining a list of documents associated with the document banking account of the user. Moreover, the method includes transferring one or more documents selected by the user into a document banking account of the third party. The method includes notifying the user and the third party about the document transaction. Additionally, the method includes redirecting the user to the third party workflow for further processing.

In additional embodiment, a method of enabling a user to perform a document transaction within a third party workflow. The method includes providing one or more user interfaces to a user, wherein the one or more interfaces are configured for: allowing the user to login into a document banking account of the user; displaying one or more documents available in the document banking account of the user; allowing the user to select one or more documents for the transaction; and allowing the user to transfer the selected documents to the third party.

BRIEF DESCRIPTION OF THE DRAWINGS

Figure 4B:
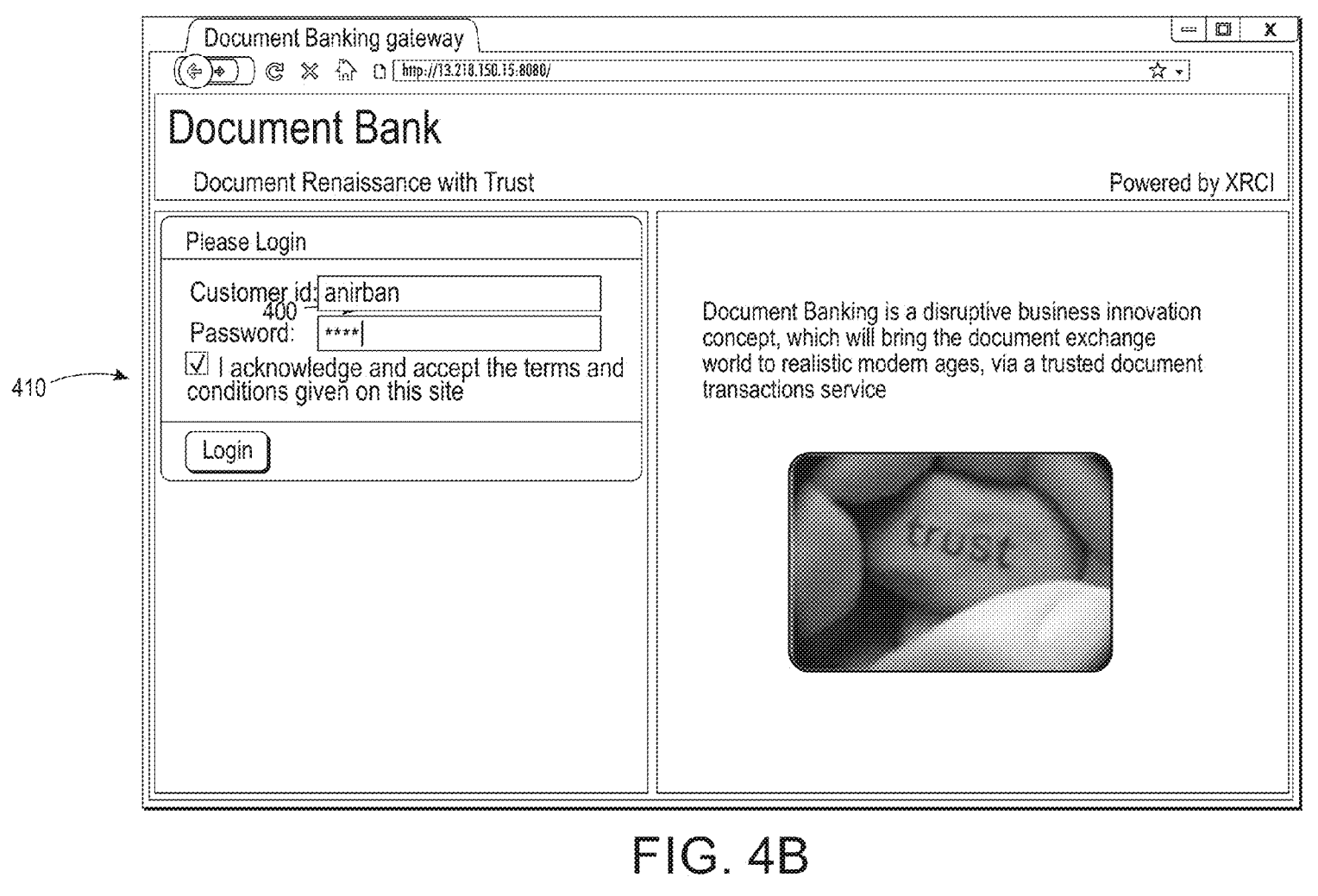

FIGS. 4A-4E illustrate a sequence of exemplary screenshots enabling a user to perform a document transaction.

DETAILED DESCRIPTION

Figure 1:
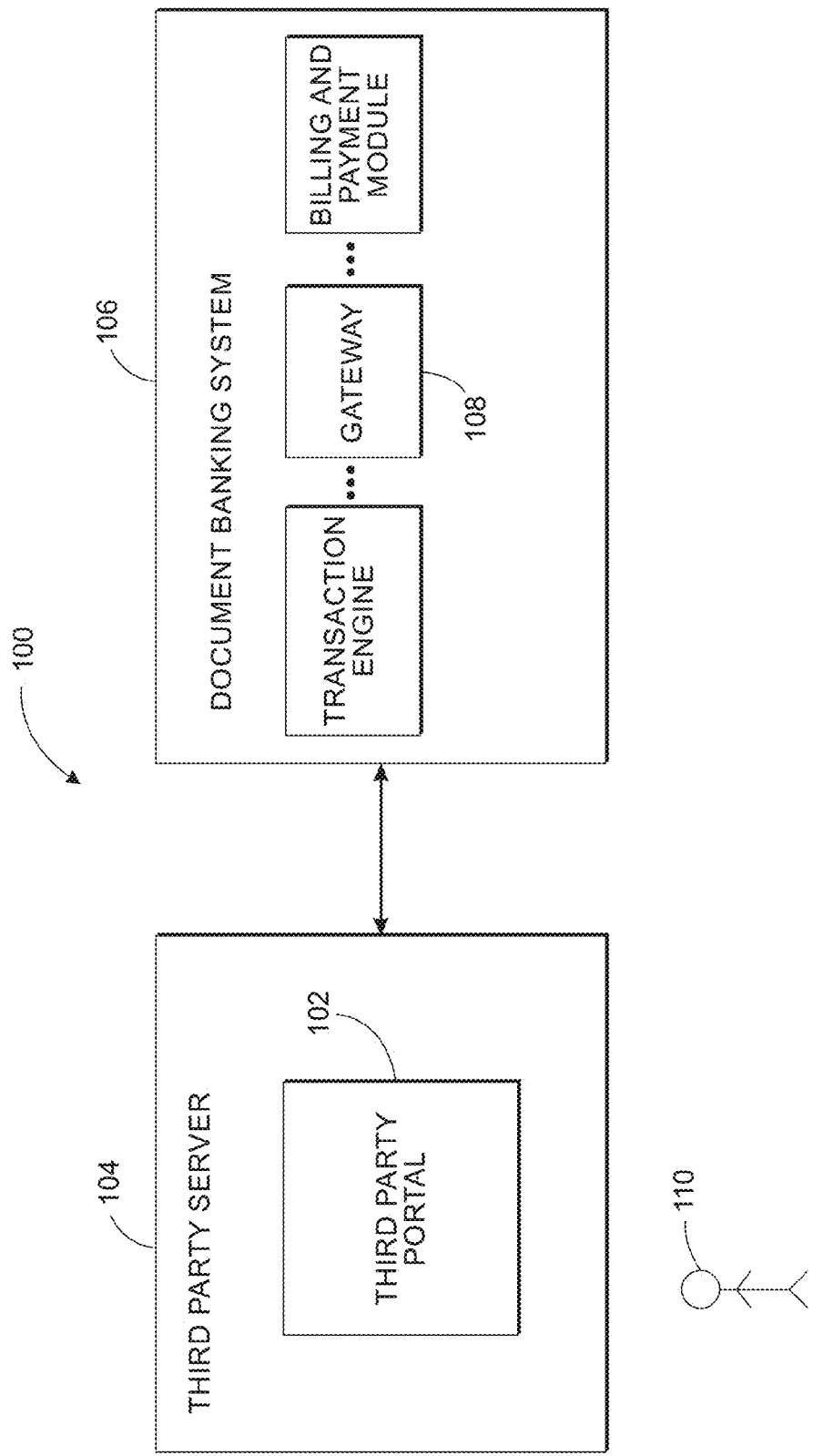
FIG. 1 illustrates an exemplary overall system in which various embodiments of the disclosure may be practiced.

The following detailed description is provided with reference to the figures. Exemplary, and in some case preferred, embodiments are described to illustrate the disclosure, not to limit its scope, which is defined by the claims. Those of ordinary skill in the art will recognize a number of equivalent variations in the description that follows.

Definitions

Definitions of one or more terms that are provided below, but for a person skilled in the art, it is understood that the definitions should not limit the scope of the disclosure. The term "document" refers to any document including information such as, text, images, or a combination of these. Various types of documents can include identity proof, address proof, receipts, or any other type of documents. Some examples of these documents include, but not limited to, driving license, passport, utility bills, fee receipts, bank statements, PAN cards, etc. The term "document banking" refers to maintaining one or more documents. In some embodiments, the "document banking" may also include transfer of those documents between one or more parties such as a user, an organization or the like. An "organization" or a "third party" may be termed to include any organization, agency, company, etc., offering various services to users, for example, loan services, visa services, medical services, insurance services, or the like. The "organization" or a "third party" uses the "document banking system" to receive documents from the users. Examples of such organizations may include, but not limited to, embassy, hospital, bank, or the like. A "user" can be an individual, an entity, or a "third party" who uses the "document banking system" to perform document transaction within a workflow such as a "third party" workflow. The phrase "document banking system" refers to a system facilitates maintaining of the documents and transfers of the documents from one document account to other document account. The "document banking system" may be a device or a software module or may also be hosted on a server. In some cases, the "document banking system" may be in the form of a server. "Workflow" refers to a set of activities generally performed by the "user" to avail any of the services. For example, the "workflow" for the visa services may be filling out forms, submitting one or more documents, making an appointment, or the like.

The term "gateway" refers to a device or a software module interacting with the "document banking system" and the "organization" to facilitate the documents transactions within the "third party" workflow. The "gateway" can be a device or a software module as a part of the "document banking system" or can be also be external to the "document banking system." Further, the "gateway" may be defined to include a front-end module and a controller. The front-end module may be configured to provide one or more user interfaces, whereas the controller may be configured to perform all the associated functionalities at back-end. The term "billing and payment module" refers to a device or a software module within the "document banking system" to handle billing and payment related activities.

Overview

Certain entities or organizations may provide services to users, such as those relating to issuance of passports, visas, loans, savings accounts, etc., and certain procedures or workflows may be required or otherwise correspond to these services. For example, the workflow for visa services may require that the user complete or otherwise provide information in forms, submit documents, make an appointment, etc. In another example, the workflow for obtaining a savings account may require that the user complete or provide information in forms, and submit certain relevant documents. To obtain or otherwise participate in any of these services, the user must visit the third party's portal (website) and participate in the third party's workflow. The user must submit one or more documents to obtain or otherwise participate in any of these services. For example, the user may need to submit an identify proof, address proof, bank statement, or the like. In accordance with the related art, the user can submit these documents either by email, courier, or by uploading these documents to the portal. Alternatively, the user can submit these documents from the user's document account by separately logging into this account, but this procedure still dis-associates the third party workflow from the user's document account. Therefore, the related art workflows defined by these organizations do not enable or allow the user to perform seamless document transactions.

It may therefore be beneficial to provide enhanced methods and systems for facilitating document transactions between a third party and a user. Some of the disclosed embodiments are directed to a gateway for integrating a third party workflow with a document banking system, and thereby enabling a user to perform document transactions within the third party workflow. The gateway includes a front-end module and a controller. The front-end module provides a number of user interfaces to the user to perform document transaction(s), and the controller performs the associated functionalities at the back-end. For example, upon receiving the login credentials of the user via a user interface, the controller may authenticate the user and the third party, transfer documents, notify the user and the third party, invoke one or more modules, or the like.

FIG. 1 illustrates an exemplary environment 100 in which various embodiments of the present disclosure can be practiced. The environment 100 includes a third party portal 102, a third party server 104, a document banking system 106, and a gateway 108. As shown, the gateway 108 is a part of the document banking system 106. In some embodiments, the gateway 108 may not necessarily be a part of the document banking system 106. In some embodiments, the document banking system 106 may include a number of modules (although not shown) such as, profile database, storage repository, verification module, secure document technologies module, document transaction engine, billing and payment module, etc., for performing various functionalities related to the document transaction. The third party server 104 communicates with the gateway 108 using known, related art, or later developed network (not shown). The network may be wired or wireless. Various examples of such networks include, but are not limited to, Local Area Network (LAN), Wide Area Network (WAN), a Metropolitan Area Network (MAN), Wireless LAN, and so forth. Additionally, the network can be a local, regional, or global communication network, such as an enterprise telecommunication network, the Internet, a global mobile communication network, or any combination of similar systems. For example, the network may be an interconnection between an enterprise network, the internet, and a cellular network.

A user 110 uses the third party portal 102 (such as bank portal) or workflow to obtain or otherwise participate in any of the services, and the third party server 104 performs the associated functionalities at the back-end. While executing the workflow, the user 110 needs to submit one or more documents. For submitting the documents, the third party server 104 (such as bank server) directs the user 110 to the gateway 108. The gateway 108 further communicates with the document banking system 106 to allow the user to perform seamless document transactions. In particular, the gateway 108 integrates the third party workflow with the document banking system 106. The gateway 108 provides a number of user interfaces enabling the user to perform document transaction within the third party workflow. Moreover, the gateway 108 facilitates the user 110 to retrieve the documents from the document account of the user 110, and submits one or more documents to the third party's document account. Further details of this procedure are explained in conjunction with subsequent figures.

Although the document transaction are described as transferring one or more document's from one account to another account, but for a person skilled in the art, it is understood some embodiments may include or otherwise cover other types of transactions.

Figure 2:
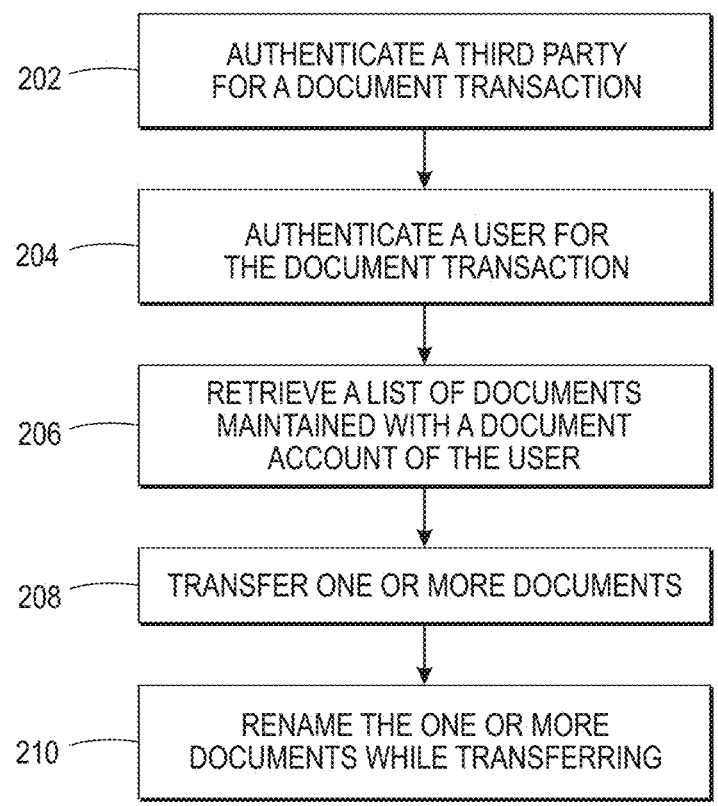
FIG. 2 is a flowchart for facilitating document transactions, in accordance with an embodiment of the present disclosure.

FIG. 2 is a flowchart for facilitating document transactions, in accordance with an embodiment of present disclosure, which outlines the functionalities performed by the gateway 108 for enabling the user to perform the document transaction within the third party's portal 102 or workflow and these functionalities are performed at the back-end.

The method deals with scenarios where the user requires submitting one or more documents when executing an online workflow. At the time of execution, the third party server 104 generates a unique identifier, which may be an identity for submitting an application form, or may be an identity of the user.

The method of FIG. 2 begins with where the third party server 104 directs the user to the gateway 108 for submitting one or more documents, and the gateway 108 further connects to the document banking system 106. When directing, the third party server 104 passes the unique identifier to the gateway 108 as well as a list of documents or documents types (or categories) required by the third party. For example, the list of document types may include identity proof, address proof, fee receipt or the like. At 202, the gateway 108 authenticates the third party for the document transaction or for receiving one or more documents. The authentication may be performed based on a certificate issued (at the time of setting up a document banking account for the third party) by the document banking system 106, alternatively, the authentication may be performed based on login credentials of the third party. Then, at 204, the gateway 108 authenticates the user. In some examples, the user may be authenticated based on login credentials. Once the user and the third party are authenticated, the gateway 108 proceeds and allows the user to login into his document banking account. Upon logging in, at 206, the gateway 108 retrieves a list of documents maintained with the document account of the user and displays that list to the user. Then, the user selects one or more documents to be transferred. Thereafter, the gateway 108 transfers the selected documents from the document account of the user to the document account of the third party at 208. In some embodiments, the gateway communicates with the transaction engine of the document banking system for transferring the selected documents from the document account of the user to the document account of the third party.

When transferring, the documents are renamed at 210. In some examples, the documents may be renamed by appending the unique identifier generated by the third party with each of the documents. This helps associating the user documents submission with the application submission. Along with this, a document type is associated with each of the documents. The method also includes mapping the documents selected by the user with the list of documents types required by the third party. It can be considered that the documents required by the third party can be identity proof, address proof, or the like. For example, if the user selects the PAN card, PAN card may be mapped with the identity proof. In another example, if the user selects the driving license, driving license may be mapped with the address proof and so on. In some cases, the single document may be mapped with multiple documents required by the third party. For example, the driving license can be mapped against the identity proof as well as the address proof.

In some embodiments, one or more documents to be transferred may be verified documents. For example, if the PAN card, driving license, and bank passbook are the documents for transfer, then PAN card may be the verified document. In other embodiments, all the documents to be transferred may be verified documents.

Thereafter, the user is notified of the document transaction and the third party is notified that document has been submitted from the user's document account to the third party's document account. In additional embodiments, the third party may access these documents by logging into the corresponding document banking account. In some embodiments, the gateway 108 invokes a billing and payment module to handle billing and payment related activities related to the document transaction. Finally, the gateway 108 redirects the user to the third part portal 102.

In additional embodiments, the method includes receiving one or more business rules from the third party server. The business rules may define the type of documents required by the third party such as which documents are accepted by the third party or which documents are rejected by the third party. These business rules may vary from third party to third party. For example, a third party may have a business rule for accepting telephone bills as address proof, while another third party may have a business rule for not accepting the telephone bills as address proof.

Figure 3:
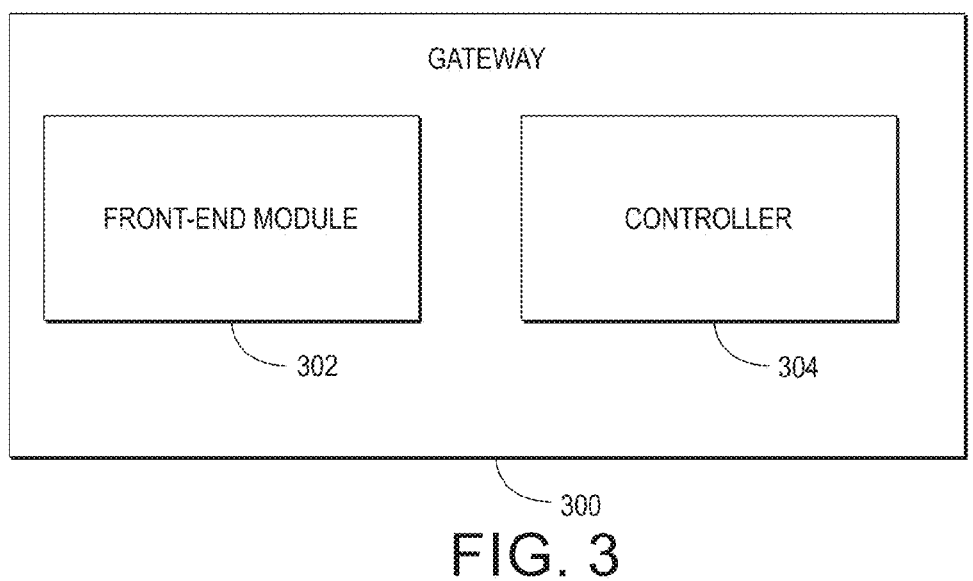
FIG. 3 illustrates an exemplary gateway, in accordance with an embodiment of the present disclosure.

FIG. 3 illustrates an exemplary gateway 300 facilitating document transactions between a third party and a document banking system. More particularly, the gateway 300 transfers documents from a user's document account to a document account of the third party. More particularly, the gateway 300 includes a front-end module 302 and a controller 304. The front-end module 302 provides various user interfaces or screens allowing the user to perform the document transaction. In other words, the front-end module 302 provides a number of web pages to the users that are used by the user for performing the document transaction. For example, the front-end module 302 may provide an interface allowing the user to login to a document account of the user. In another example, the front-end module 302 may provide an interface displaying a list of documents stored with the document account in a storage repository. In another example, the front-end module 302 may provide an interface enabling the user to select one or more documents for the document transaction. In additional examples, the front-end module 302 may provide an interface requesting the user to confirm the documents selected for the document transaction. The user interfaces discussed above are merely provided for exemplary purposes, and many more interfaces can be provided to the user for performing the document transaction.

The controller 304 is a module executing the functionalities of the gateway 300 at the back-end. More particularly, the controller 304 is configured for authenticating the third party as well as the user associated with a particular document transaction. For example, the third party may be authenticated based on a certificate issued by the document banking system. In another example, the user can be authenticated based on login credentials of the document account of the user. Upon successful authentication, the controller 304 proceeds with next steps. Then, the controller 304 retrieves a list of the documents maintained with the document account of the user. The controller 304 then transfers the selected documents from the document account of the user to a document account of the third party. Before transferring the documents, the controller 304 associates a unique identity and a document type with each of the documents. Associating the unique identity has been discussed above, thus need not be explained again. Associating the document type with each of the documents helps the third party in identifying the document type. In some embodiments, the document type may be pre-defined or may be determined based on history of the user. For example, each time when an identity proof is requested, if the user selects the PAN card, and transfers that, in such cases the controller 304 determines that PAN card is a type of identity proof and associated that with PAN card. Once determined, the controller 304 performs mapping of the selected documents against the list of documents types required by the third party and finally the documents are transferred.

Thereafter, the controller 304 invokes a billing and payment module for handling billing and payment related activities. The controller 304 then notifies the user about the transaction via email, SMS, or the like. In the similar manner, the controller 304 notifies the third party about the document transaction. Finally, the controller 304 redirects the user to the third party portal. In some embodiments, the controller 304 maintains a log of the document transaction. For example, the controller 304 maintains a log of all the documents transferred by the user.

In additional embodiments, the controller 304 is configured for creating one or more packages including documents. The packages can be created based on history of the user. For example, if the controller 304 determines that each time when an identity proof is requested, the user selects a PAN card, and when an address proof is requested, the user selects a driving license. In view of this, the controller 304 can create a document package that includes a PAN card, and a driving license such that upon subsequent request, the controller 304 suggests the document package to the user that can be transferred directly without requiring the user to select the documents. In some other embodiments, the controller 304 is configured for creating packages including documents, based on relevance of documents.

Although, the gateway 300 is shown as having the front-end module 302 and the controller 304, but for a person skilled in the art, there can be additional modules, or components required for performing the document transaction.

Figure 4C:
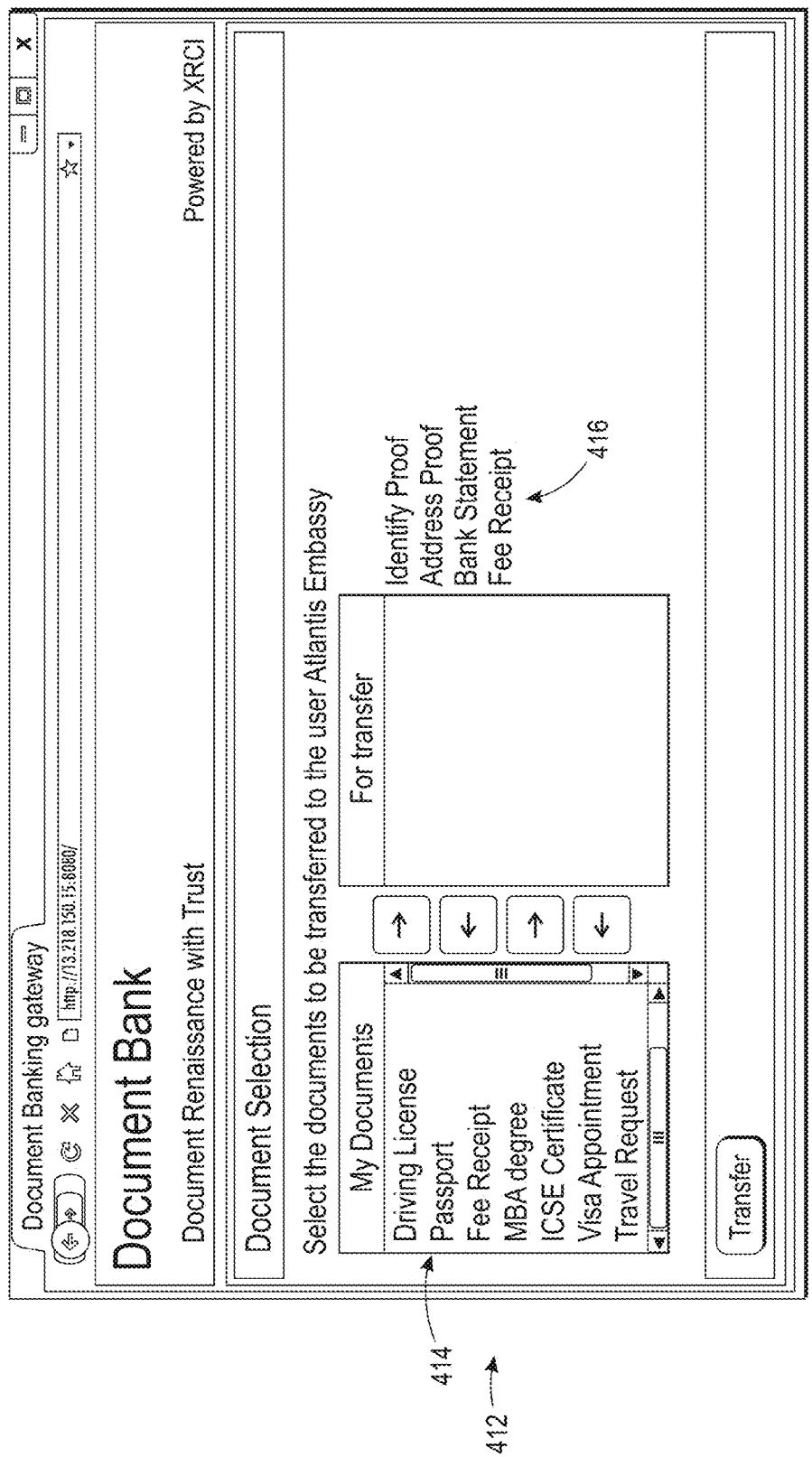
Figure 4D:
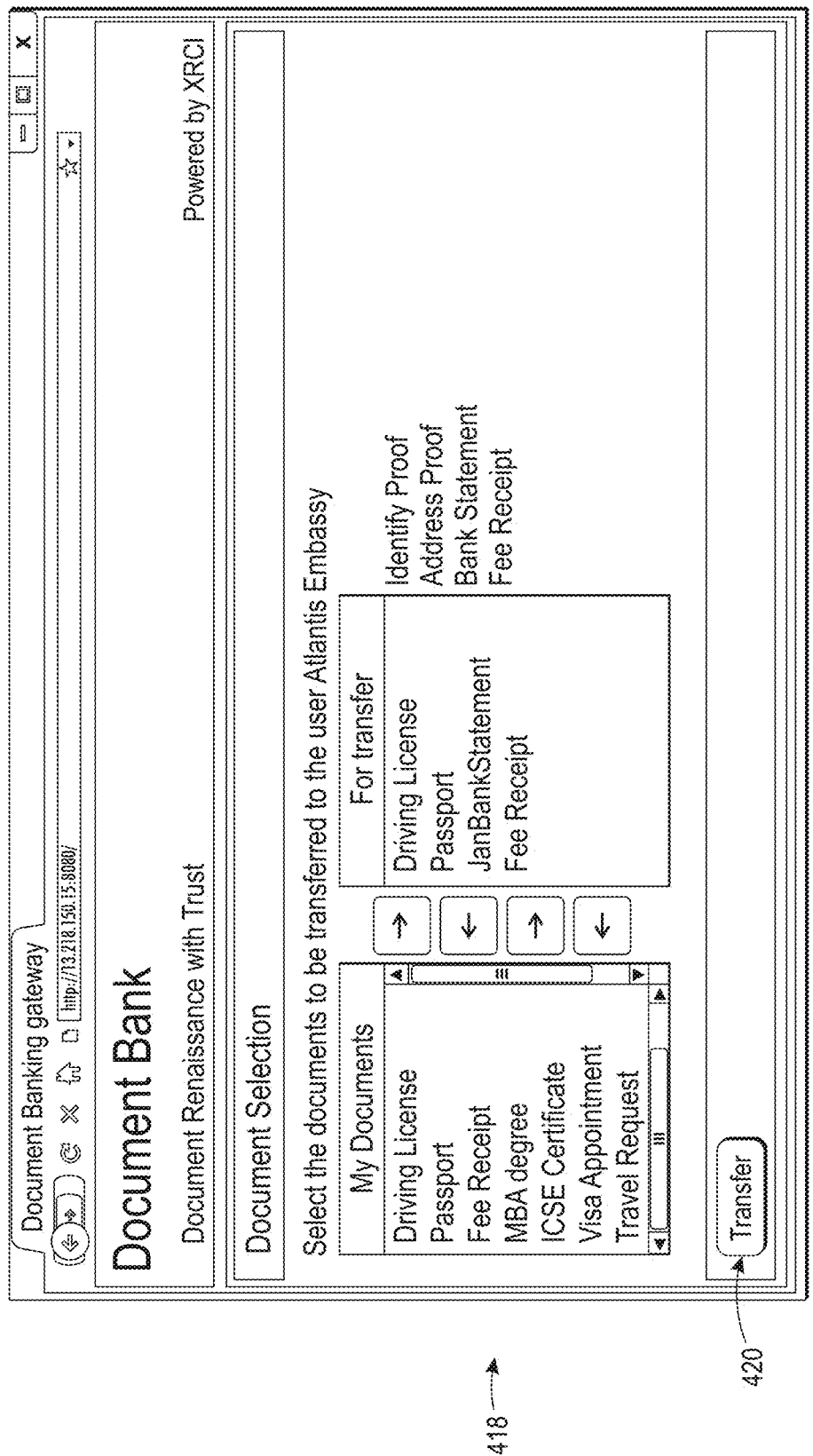

Use Case Scenario:

FIGS. 4A-4E illustrate a sequence of interfaces displayed to a user when performing a document transaction. In an example, it can be considered that the user wishes to apply for a visa, and uses a third party workflow for filling out a visa application form. One exemplary interface 400 illustrating a third party workflow is shown in FIG. 4A. The interface 400 also displays a unique identifier, marked as 402, and a list of documents 404 to be submitted by the user. The third party generates the unique identifier. For example, the user may need to submit one or more documents, such as an identity proof, address proof, bank statement or the like and that list is displayed through the user interface 400. To submit these documents, the user may be provided with a link, marked as 406, within the third party workflow to access his document banking account. Here, the user clicks the link 406 and then a web page 410 (see FIG. 4B) to login into the user document account is displayed to the user. The user can provide his login credentials. Once logged in, an interface 412 (See FIG. 4C) displays a list of documents, marked as 414, maintained with the document banking account of the user. The interface 412 also displays a list of documents, marked as 416, required by the third party. Thereafter, the user can select the documents from the list 414 that suit the required documents. For example, the user can select a driving license for the identify proof, and may select a passport for the address proof and so on (shown via an interface 418, See FIG. 4D). Once selected, the user is requested to provide his confirmation on the documents to be transferred. Once confirmed, the user clicks a transfer button (marked as 420) and documents are transferred from the document account of the user to a document account of the third party. While transferring the documents are renamed using the unique identifier generated by the third party. For example, if one of the documents is driving license and the unique identifier is 19891, then the document is renamed as 'driving license 19891'. In some examples, the document is renamed as a combination of the requirements and the unique identifier. For example, if the driving license is selected against the identity proof and the unique identity is 19891, then the document is renamed as '19891—identity proof'. Finally, the user is redirected to third party workflow as depicted via the interface 422 of FIG. 4E. The documents renamed are marked as 424 in FIG. 4E.

Various aspects of the disclosure as outlined above with respect to visa services/embassy for exemplary purposes. However, the disclosure can be implemented for various other types of services. Any modification/variation to the method and system above can be made without departing from the scope of the disclosure.

The present disclosure discloses methods and system facilitating document transactions, particularly, discloses a gateway for facilitating document transactions. The gateway allows document transactions to be carried out within third party workflows via user's document account. The gateway helps to maintain dis-association between the third party workflow and the document account of the user. The gateway further allows the user to perform seamless document transactions within third party online workflows, and thereby ensuring good user experience. The gateway enables simple and secure communication between the user, and the document banking system, and between the third party workflow and the document banking system.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A system for facilitating document transactions within a third party workflow, the system comprising:
 a third party server configured for hosting a web portal for enabling a user to perform a document transaction with one or more documents; and
 a document banking server configured for hosting the one or more documents on a document banking account associated with the user, the document banking server further configured for:
  providing one or more interfaces to the user via the web portal hosted on the third party server;
  receiving login credentials of the user to login into the document banking account of the user;
  displaying the one or more documents available in the document banking account of the user;
  receiving a selection of the one or more documents for the transaction;
  authenticating a third party associated with the third party server for the document transaction based on a third party login credential;
  authenticating the user based on a user credential,
 wherein the third party server is further configured for generating a unique identifier for the document transaction, and transmitting the unique identifier to the document banking server, and
 wherein the document banking server is further configured for:
  receiving the unique identifier from the third party server for the document transaction;
  renaming the one or more documents selected by the user based on the unique identifier;
  transferring the one or more documents selected by the user from the document banking account of the user to a document banking account of the third party; and
  redirecting the user to the web portal hosted on the third party server after the one or more documents are transferred.

2. The system of claim 1, wherein the document banking server is further configured for allowing the user to provide confirmation on the one or more documents selected for the transaction.

3. The system of claim 1, wherein the third party server is further configured for displaying a list of documents types required by the third party.

4. The system of claim 3, wherein the document banking server is configured for receiving the list of documents types required by the third party.

5. The system of claim 1, wherein the document banking server is configured for retrieving a list of the documents maintained with the document banking account of the user.

6. The system of claim 1, wherein the third party server is configured for associating a document type with each of the documents.

7. The system of claim 1, wherein the controller is configured for notifying the user about the document transaction.

8. The system of claim 1, wherein the controller is configured for notifying the third party about the document transaction.

9. The system of claim 1, wherein the controller is configured for mapping the one or more documents selected by the user to a list of one or more documents types required by the third party.

* * * * *